US007974244B2

(12) United States Patent
Hermel

(10) Patent No.: US 7,974,244 B2
(45) Date of Patent: Jul. 5, 2011

(54) METHOD AND SYSTEM FOR REDUCING UPLINK NOISE IN WIRELESS COMMUNICATION SYSTEMS

(75) Inventor: Michael J. Hermel, Waseca, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 886 days.

(21) Appl. No.: 11/842,516

(22) Filed: Aug. 21, 2007

(65) Prior Publication Data

US 2009/0054105 A1 Feb. 26, 2009

(51) Int. Cl.
*H04W 4/00* (2009.01)
(52) U.S. Cl. ........................................................ 370/334
(58) Field of Classification Search .................. None
See application file for complete search history.

(56) References Cited

U.S. PATENT DOCUMENTS

| 4,183,054 A | 1/1980 | Patisaul et al. |
|---|---|---|
| 4,611,323 A | 9/1986 | Hessenmüller |
| 4,628,501 A | 12/1986 | Loscoe |
| 4,654,843 A | 3/1987 | Roza et al. |
| 4,691,292 A | 9/1987 | Rothweiler |
| 4,999,831 A | 3/1991 | Grace |
| 5,193,109 A | 3/1993 | Chien-Yeh Lee |
| 5,243,598 A | 9/1993 | Lee |
| 5,321,849 A | 6/1994 | Lemson |
| 5,339,184 A | 8/1994 | Tang |
| 6,128,470 A * | 10/2000 | Naidu et al. ............... 455/16 |
| 7,715,865 B2 * | 5/2010 | Camp, Jr. .................. 455/522 |
| 2008/0261530 A1 * | 10/2008 | Gerstenberger et al. ..... 455/63.1 |

FOREIGN PATENT DOCUMENTS

| EP | 0391597 | 10/1990 |
|---|---|---|
| WO | 9115927 | 10/1991 |

OTHER PUBLICATIONS

Grace, Martin K., "Synchronous Quantized Subcarrier Multiplexing for Transport of Video, Voice and Data", "IEEE Journal on Selected Areas in Communications", Sep. 1990, pp. 1351-1358, vol. 8, No. 7, Publisher: IEEE.
Harvey et al., "Cordless Communications Utilising Radio Over Fibre Techniques for the Local Loop", "IEEE International Conference on Communications",Jun. 1991 , pp. 1171-1175, Publisher: IEEE.

* cited by examiner

*Primary Examiner* — Raj K Jain
(74) *Attorney, Agent, or Firm* — Fogg & Powers LLC

(57) ABSTRACT

A method and system for reducing the overall noise floor in a wireless communication system, subsystem or network are disclosed, which reduces the output gain levels of specific uplink antenna transmitters during non-signal time periods (e.g., rest mode) when no communication signals are being conveyed between the mobile unit(s) and base station involved. The output gain level of each such uplink antenna's transmitter is decreased by a predetermined amount, which reduces the noise contribution of that uplink antenna, but also maintains the gain at a high enough level so that a signal can still pass from a mobile unit to the base station via that link, for example, during a call initiation attempt.

20 Claims, 2 Drawing Sheets

METHOD AND SYSTEM FOR REDUCING UPLINK NOISE IN WIRELESS COMMUNICATION SYSTEMS

FIELD OF THE INVENTION

The present invention relates generally to the wireless communications field, and more specifically, but not exclusively, to a method and system for reducing uplink noise in wireless communication systems when multiple uplink antennas are used.

BACKGROUND OF THE INVENTION

In certain wireless communication systems, such as for example, cellular communication systems, network capacity and service coverage can be improved by using a plurality of smaller antennas at remote locations where a base station is not needed or desired. For example, such smaller antennas can be used in urban locations where Radio Frequency (RF) signals are degraded or blocked.

In this regard, a problem with cellular communications is that the radiated signals experience varying levels of degradation as they are transported over the radio air interface between a mobile station and a base station. Consequently, in order to extend service coverage and also compensate for such signal degradation, strategically-located wired or wireless signal repeaters are often used to receive, amplify and re-transmit the communication signals between the mobile stations and base station involved.

Unfortunately, a problem with the use of multiple antennas on the uplink (i.e., from the mobile station to the base station) is that each of the uplink antennas represents a noise source to the base station's receiver, and the overall noise floor is increased significantly as a result. The increased noise level interferes with the base station receiver's reception and detection of weaker signals from mobile stations that are located farther away. Consequently, service can become unavailable and communications can be blocked or dropped. More precisely, the uplink noise level is increased by $10*Log_{10}(N)$, where N represents the number of uplink antennas involved. Therefore, for example, if two uplink antennas are being used, the second antenna increases the uplink noise level by $10*Log_{10}(2)$ or approximately 3 dB.

Some approaches proposed for reducing the uplink noise floor recommend muting the uplink antenna paths during non-signal time periods when no traffic is being conveyed. However, a disadvantage of this approach is that muting an uplink antenna path increases the network's communication latency, by increasing the time it takes to restore the uplink connection and pass the signal from the mobile station to the base station (e.g., during a call initiation attempt). Consequently, the network's throughput and level of performance are reduced. Therefore, a pressing need exists for an approach that can be used to reduce the noise contribution of multiple uplink antennas in a wireless communication system, which also minimizes the effect on network throughput and level of performance for the system involved.

SUMMARY OF THE INVENTION

The present invention provides a technique for reducing the overall noise floor in a wireless communication system, subsystem or network, by reducing the output gain levels of specific uplink antenna transmitters during non-signal time periods (e.g., rest mode) when no communication signals are being conveyed between the mobile unit(s) and base station involved. The output gain level of each such uplink antenna's transmitter is decreased by a predetermined amount, which reduces the noise contribution of that uplink antenna, but also maintains the gain at a high enough level so that a signal can still pass from a mobile unit to the base station via that link, for example, during a call initiation attempt.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF PREFERRED EMBODIMENT(S)

Figure 1:
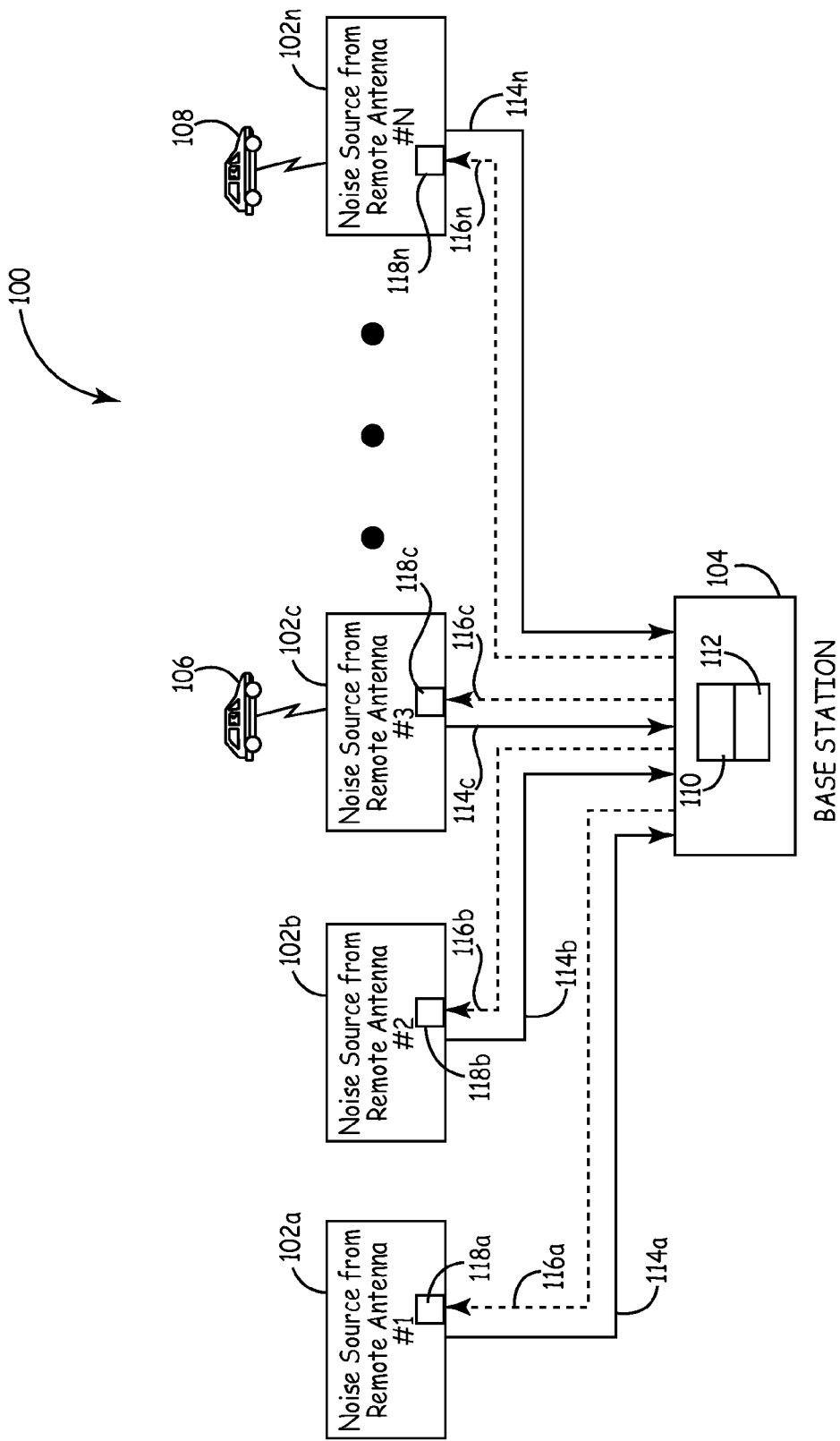
FIG. 1 depicts a block diagram of an example wireless communication system, which can be used to implement one or more embodiments of the present invention.

With reference now to the figures, FIG. 1 depicts a block diagram of an example wireless communication system 100, which can be used to implement one or more embodiments of the present invention. For at least one example embodiment, system 100 can be used to implement a cellular communication system including a network configured with a plurality of cells (e.g., macro-cells, micro-cells, pico-cells, or a combination thereof). More generally, system 100 can be used to implement any suitable wireless communication system, subsystem or network including a plurality of smaller antennas (e.g., at remote locations), and each of the smaller antennas' transmissions contribute a significant amount of noise to the overall noise floor. For clarity, the term "noise floor" may be defined as the measure of a signal created from the sum of all the noise sources and unwanted signals within the system, subsystem or network involved.

For one or more example embodiments, system 100 represents a network including a plurality of antenna units 102a through 102n, where "n" represents the total number of antenna units being used. In other words, note that the actual number of antenna units 102a-102n shown in FIG. 1 is for illustrative purposes only and not intended as a limitation on the scope of the present invention. As such, each antenna unit 102a-102n represents an uplink transmitter, a source of uplink noise, and a contributor to the overall noise floor in the network of system 100. For example, each antenna unit 102a-102n can be an uplink transmitter section of a wireless signal repeater (or relay, for analog signals). As another example, each antenna unit 102a-102n can be an uplink transmitter within a set of remotely located, distributed antennas. As still another example, one or more of antenna units 102a-102n may be used in repeaters, and the remainder of the antenna units may be used in a set of distributed antennas.

For one or more example embodiments, the network of system 100 also includes a base station 104, which is communicatively coupled to each of antenna units 102a-102n by a suitable radio air interface. For example, the radio air interface may be operated in accordance with one of the known radio air interface protocols, such as the Global system for Mobile Communications (GSM), Advanced Mobile Phone System (AMPS), Digital-AMPS (D-AMPS), Code Division Multiple Access (CDMA), Wideband CDMA (WCDMA), Time Division Multiple Access (TDMA), Cellular Digital Packet Data (CDPD), Enhanced Data rates for GSM Evolution (EDGE), General Packet Radio Service (GPRS), Integrated Enhanced Data Network (iDEN), Orthogonal Frequency Division Multiplexing (OFDM), Orthogonal Frequency Division Multiple Access (OFDMA), Universal Mobile Telecommunication System (UMTS), $3^{rd}$ Generation Partnership Project (3GPP), Wireless Fidelity (WiFi), Worldwide Interoperability for Microwave Access (WiMAX), RF Identification (RFID), and similar other wireless (terrestrial or airborne) protocols. In any event, it should be understood that the type of wireless network and radio air interface protocol actually used is simply a design choice, and the present invention is not intended to be limited to the use of a specific type of wireless system, network and/or protocol.

As an illustrative example, two mobile units 106 and 108 are shown in FIG. 1. For example, depending on the particular type of network and/or protocol involved, mobile units 106 and 108 can be implemented as mobile stations, mobile terminals, user equipment, subscriber terminals, and the like. In any event, mobile unit 106 is communicatively coupled via a wireless link to antenna unit 102c, and mobile unit 108 is communicatively coupled via a wireless link to antenna unit 102n. Consequently, mobile unit 106 can send/receive digital and/or analog (speech/data) information to/from base station 104 via antenna unit 102c, and mobile unit 108 can send/receive digital and/or analog information to/from base station 104 via antenna unit 102n. Notably, for illustrative purposes, it may be assumed that mobile units 106 and 108 are both operating in an active mode, and communication signals (e.g., digital or analog speech, data, traffic, etc.) are being transported on respective uplink channels via antenna units 102c and 102n to a receiver 110 of base station 104. Also, for illustrative purposes, it may be assumed that no mobile unit is actively connected to antenna unit 102a or 102b. Thus, for this illustrative example, it may be assumed that the uplink transmissions from antenna units 102a and 102b include no communication signals and are purely noise.

Note that the uplink transmission from each antenna unit 102a-102n contributes a unique level of noise to the overall noise floor perceived by receiver 110. In this regard, the noise contribution of each antenna unit 102a-102n is represented by a respective one of the solid lines labeled 114a-114n.

For some embodiments, base station 104 can include a suitable processing unit (or control logic) 112, which can generate suitable control signals to control the output gain levels of the uplink transmitters 118a-118n in antenna units 102a-102n. These gain control signals can be conveyed from processing unit (or control logic) 112 in base station 104 to each uplink transmitter 118a-118n via a respective wireless or wired connection, as indicated by the dashed lines labeled 116a-116n. For other embodiments, a suitable processing unit (or control logic) can be included in each antenna unit 102a-102n, and each antenna unit 102a-102n can be configured to control the output gain level of its own uplink transmitter 118a-118n.

Figure 2:
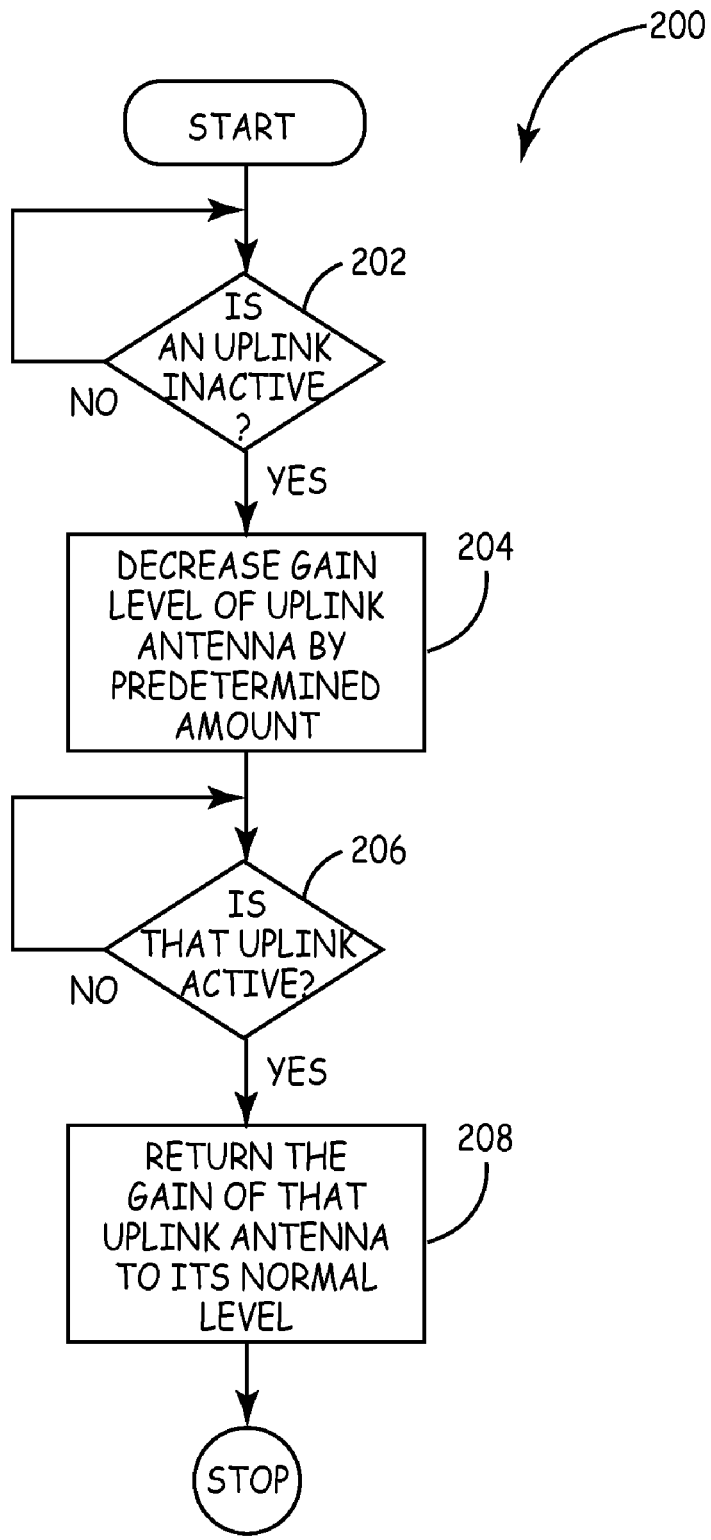
FIG. 2 is a flow chart depicting an example method for reducing uplink noise in a wireless communication system, which can be used to implement one or more embodiments of the present invention.

FIG. 2 is a flow chart depicting an example method 200 for reducing uplink noise in a wireless communication system, which can be used to implement one or more embodiments of the present invention. For example, method 200 can be used to implement the one or more embodiments depicted by wireless communication system 100 shown in FIG. 1.

Essentially, in accordance with the present invention, method 200 provides a viable technique for reducing the overall noise floor in a wireless communication system, subsystem or network, by reducing the output gain levels of specific uplink antenna transmitters during non-signal time periods (e.g., rest mode) when no communication signals are being conveyed between the mobile unit(s) and base station involved. The present method decreases the output gain level of each such uplink antenna's transmitter by a predetermined amount, which reduces the noise contribution of that uplink antenna, but also maintains the gain at a high enough level so that a signal can still pass from a mobile unit to the base station via that link, for example, during a call initiation attempt.

Referring now to FIGS. 1 and 2 for one or more example embodiments, method 200 begins by determining if an uplink is inactive (step 202). For example, in some implementations, the processing unit 110 (or a similar functionality) in base station 104 can assess each uplink (e.g., and/or downlink) to determine whether or not communication signals are being conveyed. In another implementation, for example, the processing unit 110 in base station 104 can determine if each uplink antenna 102a-102n is operating in an active or inactive mode. In yet another exemplary implementation, a suitable processing unit (or control logic) in each antenna unit 102a-102n can determine if its respective uplink is active or inactive, or whether or not communication signals are being conveyed via that link. In any event, if (at step 202) it is determined that no uplink is inactive, then method 200 can remain in a wait state (as shown) or terminate.

However, if at step 202, the processing unit (or control logic) in the base station 104 (or, for example, in an uplink antenna) determines that an uplink is inactive, the processing unit (or control logic) can generate a control signal to decrease the output gain level of that uplink antenna's transmitter by a predetermined amount (step 204). For example, in a network implementation that includes only two uplink antennas, if the gain (and thereby the noise contribution) of the second uplink antenna's transmitter were to be decreased by 10 dB, the noise contributed by the second uplink antenna's transmission would increase the overall noise level by only $10*Log_{10}(1+0.1)$, or 0.41 dB. Thus, in this example, the present invention provides a noise level improvement of about 2.59 dB (i.e., 3.0 dB−0.41 dB) over the existing techniques.

As another illustrative example, in a network implementation that includes 11 uplink antennas, if the gain of 10 (e.g., inactive) uplink antennas' transmitters were to be decreased by 10 dB, the noise contributed by the 10 uplink antennas would be equal to that of the one (active) uplink antenna, and the resulting increase in the overall noise level would only be $10*Log_{10}(1+1)$, or 3 dB. Thus, in this example, the present invention provides a substantial noise level improvement of 7.41 dB (i.e., 10.41 dB−3.0 dB) over the existing techniques.

Method 200 continues by determining if the inactive uplink has become active (step 206). For example, the processing unit (or control logic) 110 in the base station 104 (or in the uplink antenna unit involved) can assess that uplink to determine if communication signals are being conveyed (e.g., active uplink). If (at step 206) it is determined that the uplink is still inactive, then method 200 can remain in a wait state (as shown) or terminate.

However, if at step 206, the processing unit (or control logic) 110 in the base station 104 (or, for example, in that uplink antenna) determines that the uplink is now active, the processing unit (or control logic) can generate a suitable control signal to increase the output gain of that uplink antenna's transmitter back to its normal level (step 208). For example, in the above-described implementation with 2 uplink antennas, the subject uplink antenna's transmit gain level can be increased by 3 dB to return it to its original level.

It is important to note that while the present invention has been described in the context of a fully functioning wireless communication system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular wireless communication system.

The description of the present invention has been presented for purposes of illustration and description, and is not intended to be exhaustive or limited to the invention in the form disclosed. Many modifications and variations will be apparent to those of ordinary skill in the art. These embodiments were chosen and described in order to best explain the principles of the invention, the practical application, and to enable others of ordinary skill in the art to understand the invention for various embodiments with various modifications as are suited to the particular use contemplated.

What is claimed is:

1. A method for reducing uplink noise in a wireless communication system, comprising the steps of:
    determining if an uplink communication path in the wireless communication system is inactive;
    if the uplink communication path is inactive, decreasing a gain level of an uplink antenna unit associated with the uplink communication path to a first predetermined value;
    determining if the uplink communication path in the wireless communication system is active; and
    if the uplink communication path is active, increasing the gain level of the uplink antenna unit associated with the uplink communication path to a second predetermined value.

2. The method of claim 1, wherein the first predetermined value is substantially lower than the second predetermined value.

3. The method of claim 1, wherein the step of determining if an uplink communication path in the wireless communication system is inactive comprises a step of determining whether or not a communication signal is being conveyed between a mobile unit and a base station via the uplink communication path.

4. The method of claim 1, wherein the step of determining if an uplink communication path in the wireless communication system is inactive comprises a step of determining if the uplink antenna unit is operating in a rest mode.

5. The method of claim 1, wherein the step of determining if the uplink communication path in the wireless communication system is active comprises a step of determining if at least one of the uplink antenna unit and a mobile unit connected via the uplink communication path is operating in an active communication mode.

6. The method of claim 1, wherein the step of determining if the uplink communication path in the wireless communication system is active comprises a step of determining if at least one of the uplink antenna unit and a mobile unit connected via the uplink communication path is transporting a communication signal on the uplink communication path.

7. The method of claim 1, wherein the gain level of the uplink antenna unit is associated with a level of uplink noise in the wireless communication system.

8. The method of claim 1, wherein the step of determining if an uplink communication path in the wireless communication system is inactive is performed at a base station.

9. The method of claim 1, wherein the step of determining if an uplink communication path in the wireless communication system is inactive is performed at the uplink antenna unit.

10. The method of claim 1, wherein the step of decreasing the gain level of an uplink antenna unit associated with the uplink communication path to a first predetermined value comprises a step of decreasing a transmitter's output gain.

11. A method for reducing uplink noise in a cellular communications network, comprising the steps of:
    determining whether or not a remote antenna unit in the cellular communications network is receiving at least one communication signal from a mobile unit;
    if the remote antenna unit in the cellular communications network is not receiving at least one communication signal from a mobile unit, decreasing a transmit antenna gain of the remote antenna unit to a first predetermined value;
    re-determining whether or not the remote antenna unit in the cellular communications network is receiving at least one communication signal from a mobile unit; and
    if the remote antenna unit in the cellular communications network is receiving at least one communication signal from a mobile unit, increasing the transmit antenna gain of the remote antenna unit to a second predetermined value.

12. The method of claim 11, wherein the remote antenna unit comprises a wireless digital signal repeater or a wireless analog signal relay.

13. The method of claim 11, wherein the remote antenna unit comprises an uplink antenna in a set of distributed antennas.

14. The method of claim 11, wherein the cellular communications network includes a radio air interface that can operate in a terrestrial or airborne configuration in accordance with at least one of a GSM, AMPS, D-AMPS, CDMA, WCDMA, TDMA, CDPD, EDGE, GPRS, iDEN, OFDM, OFDMA, UMTS, 3GPP, WiFi, WiMAX, or RFID protocol.

15. A system for reducing uplink noise in a wireless communications network, comprising:
    a plurality of mobile units;
    a base station; and
    a plurality of uplink antenna units located between the plurality of mobile units and the base station, wherein a control unit associated with at least one of the base station and an uplink antenna unit of the plurality of uplink antenna units is configured to:

determine if a communication link associated with the uplink antenna unit is active or inactive;

if the communication link is inactive, decrease a gain level of the uplink antenna unit to a first predetermined value;

re-determine if the communication link is active or inactive; and if the communication link is active, increase the gain level of the uplink antenna unit to a second predetermined value.

16. The system of claim 15, wherein the wireless communication network comprises a cellular communications network.

17. The system of claim 15, wherein the uplink antenna unit comprises a remote uplink antenna unit.

18. The system of claim 15, whereby a decrease of the gain level of the uplink antenna unit is associated with a decrease in an amount of noise contributed by the uplink antenna unit to an overall noise floor.

19. The system of claim 15, wherein the first predetermined value is substantially lower than the second predetermined value.

20. The system of claim 15, wherein the wireless communication network comprises a terrestrial or airborne wireless communication network.

* * * * *